United States Patent
Tamaki et al.

(10) Patent No.: US 9,952,816 B2
(45) Date of Patent: Apr. 24, 2018

(54) DATA PROCESSING APPARATUS, CONTROL METHOD, AND STORAGE MEDIUM

(71) Applicant: CANON KABUSHIKI KAISHA, Tokyo (JP)

(72) Inventors: Wataru Tamaki, Kawasaki (JP); Yosuke Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/250,238

(22) Filed: Apr. 10, 2014

(65) Prior Publication Data

US 2014/0320875 A1    Oct. 30, 2014

(30) Foreign Application Priority Data

Apr. 26, 2013  (JP) ................................. 2013-093890

(51) Int. Cl.
*G06F 3/12*    (2006.01)

(52) U.S. Cl.
CPC .......... *G06F 3/1277* (2013.01); *G06F 3/1206* (2013.01); *G06F 3/1228* (2013.01); *G06F 3/1288* (2013.01)

(58) Field of Classification Search
CPC .... G06F 3/1277; G06F 3/1288; G06F 3/1206; G06F 3/1228
USPC ...... 358/1.13, 1.15, 1.16, 1.9; 345/505, 506; 382/303, 304
See application file for complete search history.

(56) References Cited

U.S. PATENT DOCUMENTS

| | | | | |
|---|---|---|---|---|
| 2006/0274969 | A1* | 12/2006 | Nagao | G06T 1/20 382/276 |
| 2009/0009807 | A1* | 1/2009 | Sugi | H04N 1/00127 358/1.15 |
| 2009/0109483 | A1* | 4/2009 | Shimmoto | H04N 1/00954 358/1.15 |
| 2010/0020356 | A1* | 1/2010 | Kawasaki | G06F 3/1204 358/1.15 |

(Continued)

FOREIGN PATENT DOCUMENTS

| | | |
|---|---|---|
| JP | 2006-133877 A | 5/2006 |
| JP | 2008226033 A | 9/2008 |
| JP | 2012128651 A | 7/2012 |

(Continued)

*Primary Examiner* — Kent Yip
(74) *Attorney, Agent, or Firm* — Canon U.S.A., Inc. IP Division

(57) ABSTRACT

A data processing apparatus to acquire a job from an external apparatus via a network and process the job includes a storage unit, a selection unit, and a processing unit. The job includes a data and setting information to process the data. The storage unit stores a plurality of processing modules. The selection unit selects a plurality of processing modules to be used in processing the data, from the plurality of processing modules, based on setting information included in the job. The processing unit causes the selected plurality of processing modules to sequentially perform processing on the data. In a case where processing is to be sequential performed by a first processing module and then a second processing module included in the selected plurality of processing modules, the processing unit inputs information processed by the first processing module into the second processing module.

12 Claims, 18 Drawing Sheets

(56) References Cited

U.S. PATENT DOCUMENTS

2010/0214599 A1    8/2010   Zhan
2012/0137215 A1*   5/2012   Kawara ................ G06F 3/1206
                                                                                                            715/249

FOREIGN PATENT DOCUMENTS

| JP | 2012187867 A | 10/2012 |
| JP | 2012-216064 A | 11/2012 |
| JP | 2013008172 A | 1/2013 |

* cited by examiner

FIG.5

```
<JobDefinition>
  <Application id="PrintService1"/>
  <InputPath value=".¥Input.pdf"/>
  <OutputPath value=".¥Output¥"/>
  <TicketPath type="Ticket1" value=".¥Ticket1.xml"/>
  <TicketPath type="Ticket2" value=".¥Ticket2.xml"/>
</JobDefinition>
```

FIG.6

```
<Applications>
  <Application id="PrintService1">                              ← 601
    <FilterConfig path=".¥PrintService1_FilterConfig.xml"/>
  </Application>
  <Application id="PrintService2">
    <FilterConfig path=".¥PrintService2_FilterConfig.xml"/>
  </Application>
</Applications>
```

FIG.7

```
<Filters>
  <Filter name="FilterA" >
    <Module>.¥FilterA.dll</Module>
  </Filter>
  <Filter name="FilterB" >
    <Module>.¥FilterB.dll</Module>
  </Filter>
  <Filter name="FilterC" >
    <Module>.¥FilterC.dll</Module>
  </Filter>
</Filters>
```

FIG.11

```
<Filters>
  <Filter name="FilterA" >
    <Module>.¥FilterA.dll</Module>
    <Tickets>                              ← 1101
      <Ticket type="Ticket1" />
      <Ticket type="Ticket2" />
    </Tickets>
  </Filter>
  <Filter name="FilterB" >
    <Module>.¥FilterB.dll</Module>
    <Tickets>                              ← 1102
      <Ticket type="Ticket2" />
    </Tickets>
  </Filter>
  <Filter name="FilterC" >
    <Module>.¥FilterC.dll</Module>
    <Tickets>                              ← 1103
      <Ticket type="Ticket1" />
    </Tickets>
  </Filter>
</Filters>
```

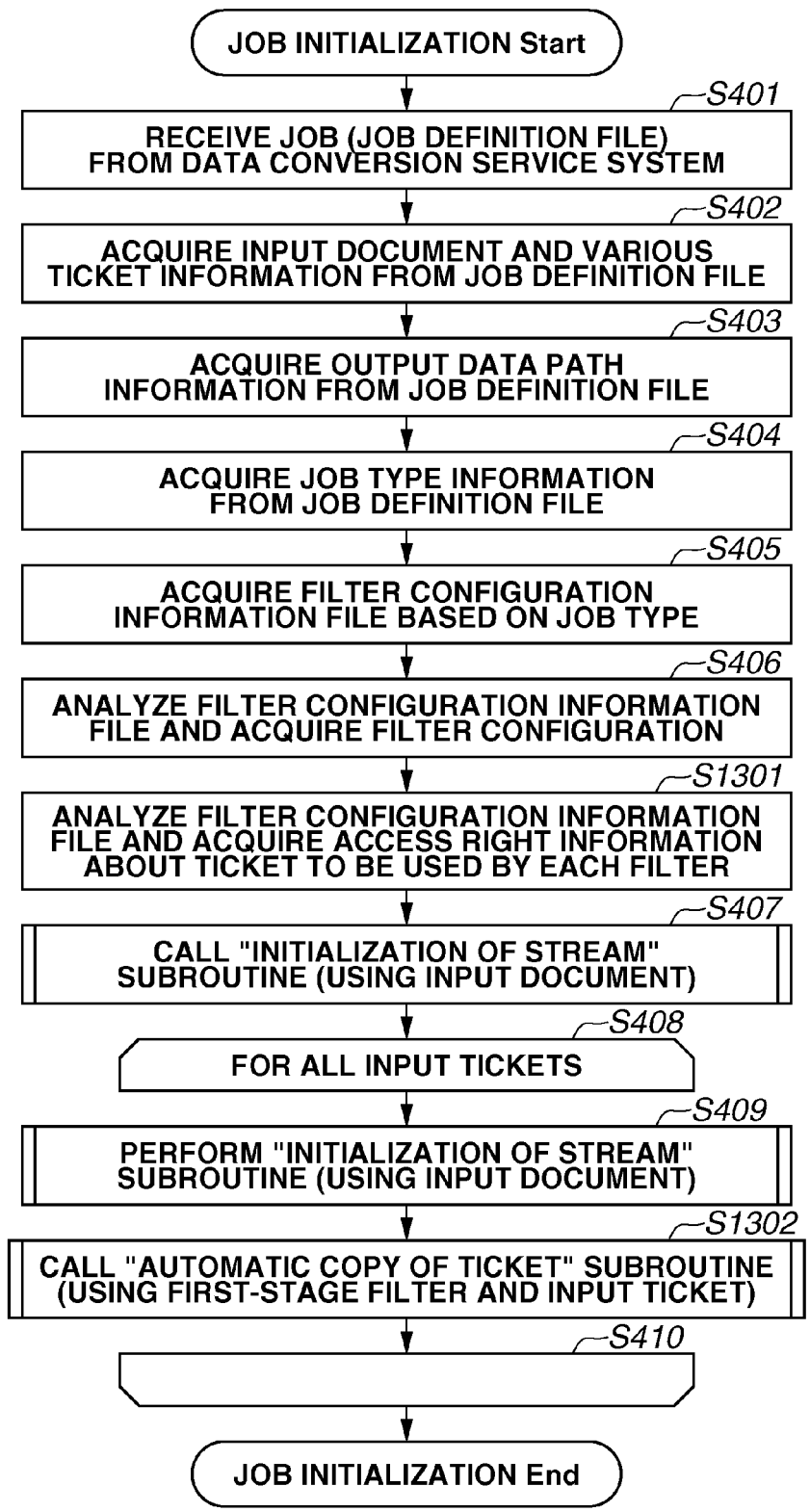

FIG.14

```
<Filters>
 <Filter name="FilterA" >
  <Module>.¥FilterA.dll</Module>
  <Tickets>                                    ← 1401
   <Ticket type="Ticket1" access="R" />
   <Ticket type="Ticket2" access="RW" />
  </Tickets>
 </Filter>
 <Filter name="FilterB" >
  <Module>.¥FilterB.dll</Module>
  <Tickets>                                    ← 1402
   <Ticket type="Ticket1" access="RW" />
   <Ticket type="Ticket2" access="R" />
  </Tickets>
 </Filter>
 <Filter name="FilterC" >
  <Module>.¥FilterC.dll</Module>
  <Tickets>                                    ← 1403
   <Ticket type="Ticket1" access="R" />
   <Ticket type="Ticket2" access="R" />
  </Tickets>
 </Filter>
</Filters>
```

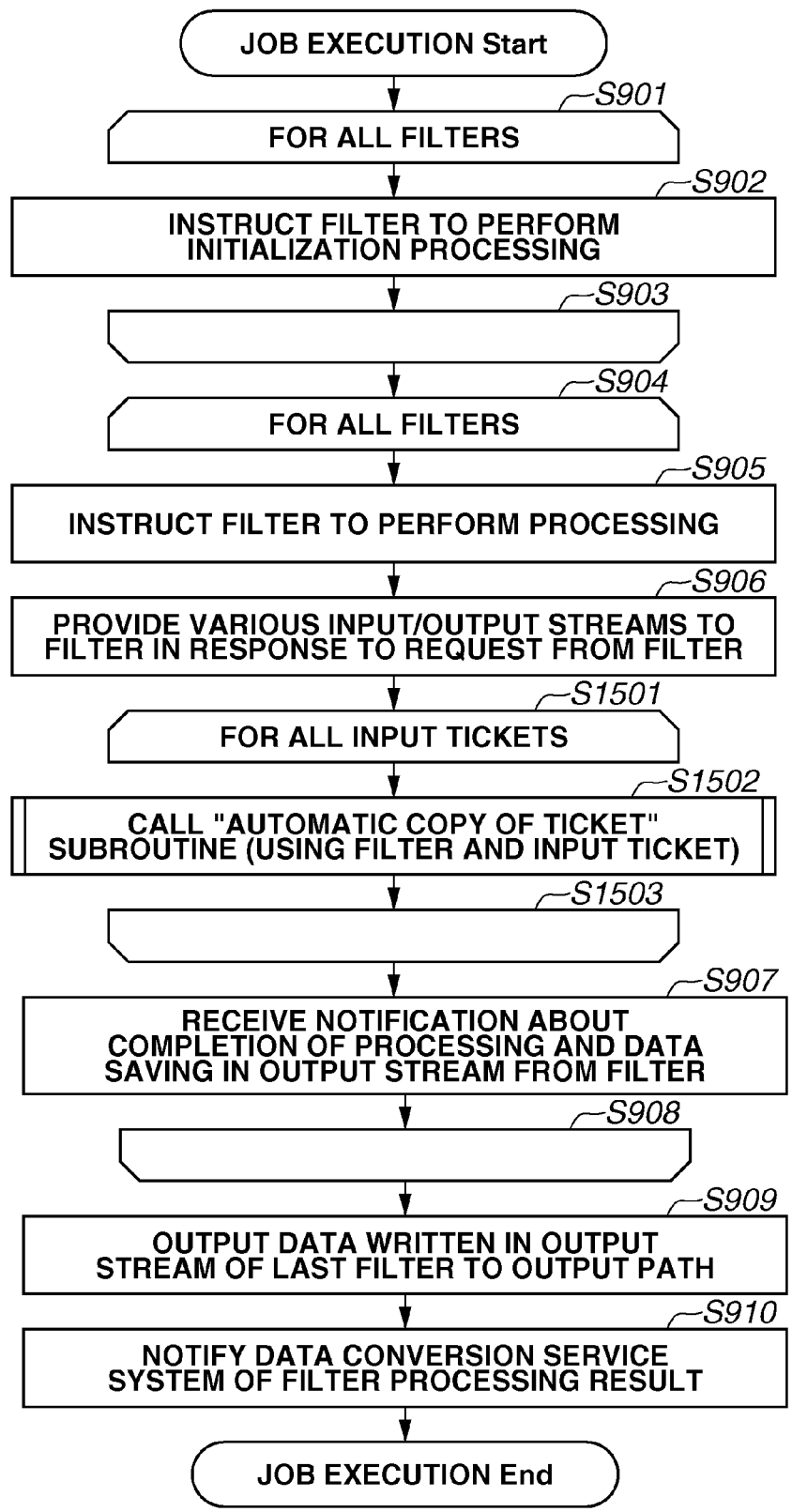

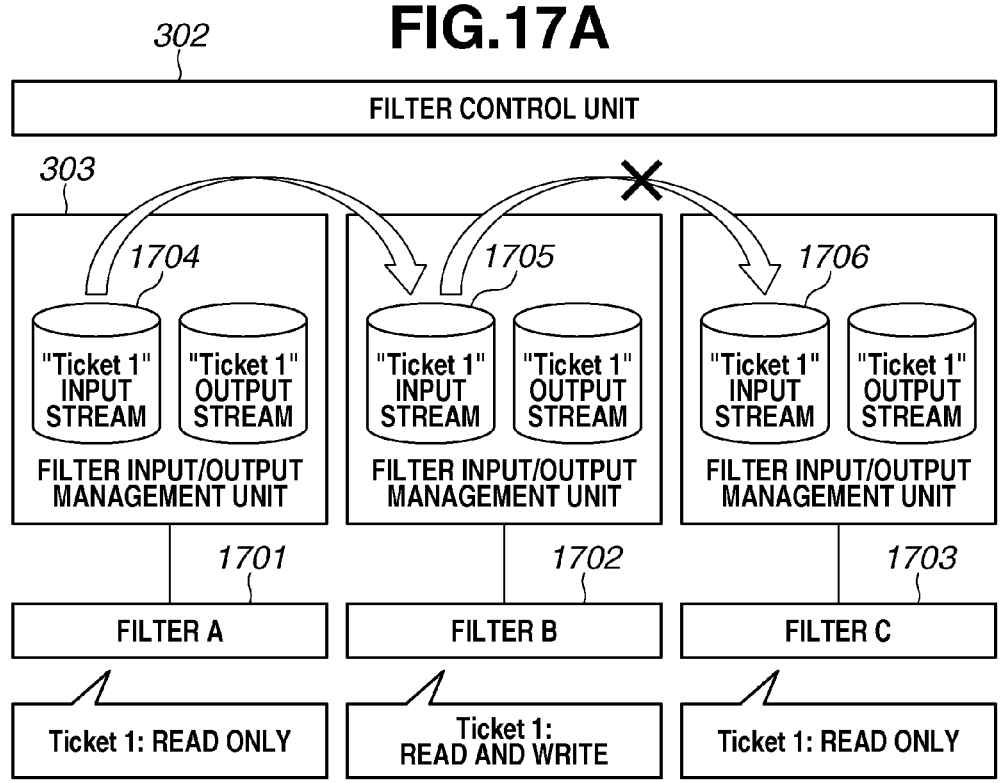
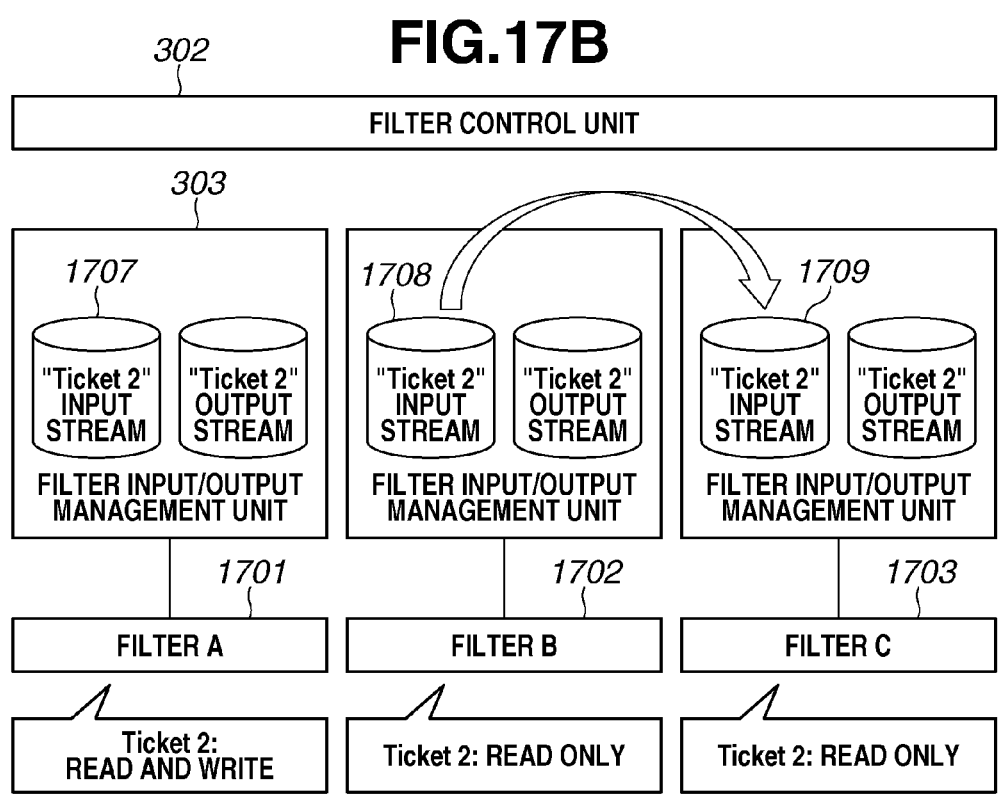

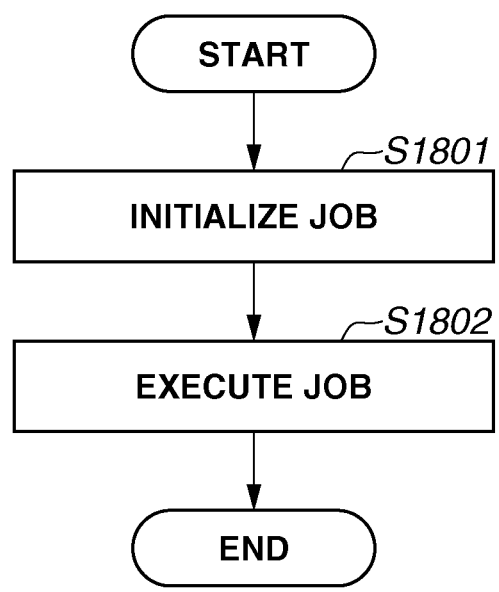

DATA PROCESSING APPARATUS, CONTROL METHOD, AND STORAGE MEDIUM

BACKGROUND OF THE INVENTION

Field of the Invention

The present invention relates to a data processing apparatus, a data processing method, and a storage medium.

Description of the Related Art

The widespread usage of a cloud computing system has introduced a new service which opens various types of software services to the public, which is generally referred to as "Software as a Service (SaaS)". A service generally referred to as "cloud print service" is an example of SaaS. The cloud print service enables a remote printer connected via a network to print a document stored in a cloud server.

In the cloud print service, it is essentially required to convert various document formats stored in the cloud server into appropriate data that can be interpreted by a wide variety of printers.

To generate print data to be transmitted to a printer, it is conventionally useful to install a device driver program (hereinafter, simply referred to as "printer driver") on a server apparatus to control a printer to be used and cause the printer driver to perform data conversion.

For example, as discussed in Japanese Patent Application Laid-Open No. 2006-133877, it is conventionally feasible to select an optimum printer driver from a plurality of format conversion modules installed beforehand on a server apparatus based on a received input file and information indicating an output file format. The selected printer driver converts the format of the input file.

Further, as discussed in Japanese Patent Application Laid-Open No. 2012-216064, it is conventionally feasible to prepare a general (or common) driver together with unique printer drivers dedicated to respective models on a server apparatus. The method discussed in Japanese Patent Application Laid-Open No. 2012-216064 includes performing common print settings to convert a print target into printer independent data (intermediate data) at a "print data generation instruction" stage. The method further includes performing Raster Image Processing (RIP) on the printer independent data using a unique driver dedicated to each model to obtain print data suitable for each model at a "print start instruction" stage.

As discussed in Japanese Patent Application Laid-Open No. 2006-133877 or Japanese Patent Application Laid-Open No. 2012-216064, a server apparatus is required to install a wide variety of printer drivers that are applicable to various printers to be used in printing because the server apparatus requires the printer driver to perform data conversion. Therefore, it takes significant time and labor in the installation and update management.

Further, the number of types of data that are processed by the cloud print service is increasing. Therefore, the server apparatus is required to expand data convertibility. To this end, the server apparatus is forced to do a complicated work to correct all printer drivers installed thereon.

SUMMARY OF THE INVENTION

The present invention is directed to a data processing apparatus capable of facilitating server maintenance in a cloud print service without requiring preparing many printer drivers corresponding to various printer drivers. The present invention is further directed to a related control method and a storage medium. In an example, there is provided a data processing apparatus. The data processing apparatus selects a designated number of processing modules to be used in data processing, from a plurality of available processing modules, instead of using a printer driver to perform the data processing. The data processing apparatus performs sequential processing using the selected modules.

Aspects of the present invention include a data processing apparatus to acquire a job from an external apparatus via a network and process the job, wherein the job includes a data to be processed and setting information required to process the data. The data processing apparatus includes a storage unit configured to store a plurality of processing modules to be used to process the job, a selection unit configured to select a plurality of processing modules to be used in processing the data, from the plurality of processing modules, based on setting information included in the job, and a processing unit configured to cause the selected plurality of processing modules to sequentially perform processing on the data, wherein, in a case where processing is to be sequential performed by a first processing module and then a second processing module included in the selected plurality of processing modules, the processing unit is configured to input information processed by the first processing module into the second processing module.

Further features of the present invention will become apparent from the following description of exemplary embodiments with reference to the attached drawings.

BRIEF DESCRIPTION OF THE DRAWINGS

FIG. 5 illustrates an example of job definition information.

FIG. 6 illustrates an example of a file in which correspondence information is described.

FIG. 7 illustrates an example of filter configuration information.

FIG. 11 illustrates an example of filter configuration information.

FIG. 13 is a flowchart illustrating job initialization processing according to an exemplary embodiment.

FIG. 14 illustrates an example of filter configuration information according to an exemplary embodiment.

FIG. 15 is a flowchart illustrating job execution processing according to an exemplary embodiment.

FIGS. 17A and 17B are conceptual diagrams illustrating data conversion application in a case where the "automatic copy of ticket" processing is performed.

FIG. 18 is a flowchart schematically illustrating job processing in data conversion processing according to an exemplary embodiment.

DESCRIPTION OF THE EMBODIMENTS

Various exemplary embodiments, features, and aspects of the invention will be described in detail below with reference to the drawings.

Figure 1:
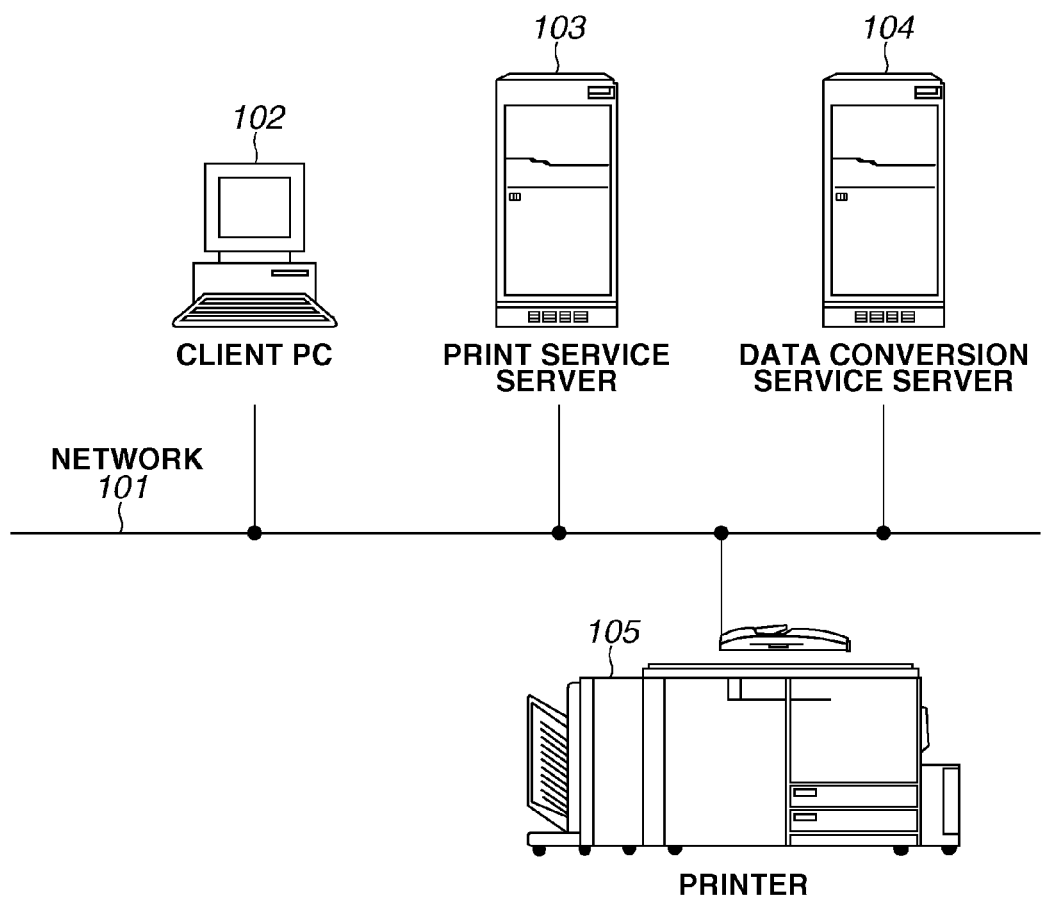
FIG. 1 schematically illustrates a configuration example of a printing system according to an exemplary embodiment.

FIG. 1 schematically illustrates a configuration example of a printing system according to a first exemplary embodiment.

The printing system illustrated in FIG. 1 includes a client PC 102, a print service server 103, a data conversion service server 104, and a printer 105, which are mutually connected via a network 101.

The client PC 102 can access the print service server 103 using a web browser operating thereon and can transmit a print instruction to print a document stored in the print service server 103. When the client PC 102 generates a print instruction, the client PC 102 can designate a print target document file, tickets, and a printer to be used in printing. In the present exemplary embodiment, the ticket is a file that describes settings to be applied when the print target document is converted into print data.

The print service server 103 can request the data conversion service server 104 to perform data conversion (can issue a data conversion request), using a web application operating thereon, in response to a print request from the client PC 102 (including information identifying a document file, tickets, and designation information indicating a printer that performs printing based on a job). The data conversion request includes the conversion target document file, the tickets, and the designated printer. Further, the print service server 103 can receive converted print data (page description language (PDL) and printer control information) from the data conversion service server 104, and instruct the printer 105 to perform printing based on the received print data. In the following description, a file described in a PDL format is referred to as PDL.

The data conversion service server 104 is a server that includes a data conversion application operating thereon. When the data conversion service server 104 receives the data conversion request from the print service server 103, the data conversion service server 104 converts the conversion target document file included in the data conversion request into print data suitable for a designated printer. Then, the data conversion service server 104 transmits the converted print data and the ticket (including a summary of conversion result) to the print service server 103.

The printer 105 receives a print instruction (including information indicating a storage place of the converted print data) from the print service server 103. In response to the print instruction, the printer 105 acquires print data from the print service server 103 and performs printing based on the acquired print data.

The present invention is not limited to the printing system having the configuration illustrated in FIG. 1 and can be embodied in various ways. For example, the client PC 102, the print service server 103, and the data conversion service server 104 can be realized by a single computer. The print service server 103 and the data conversion service server 104 can be realized by different computers.

Figure 2:
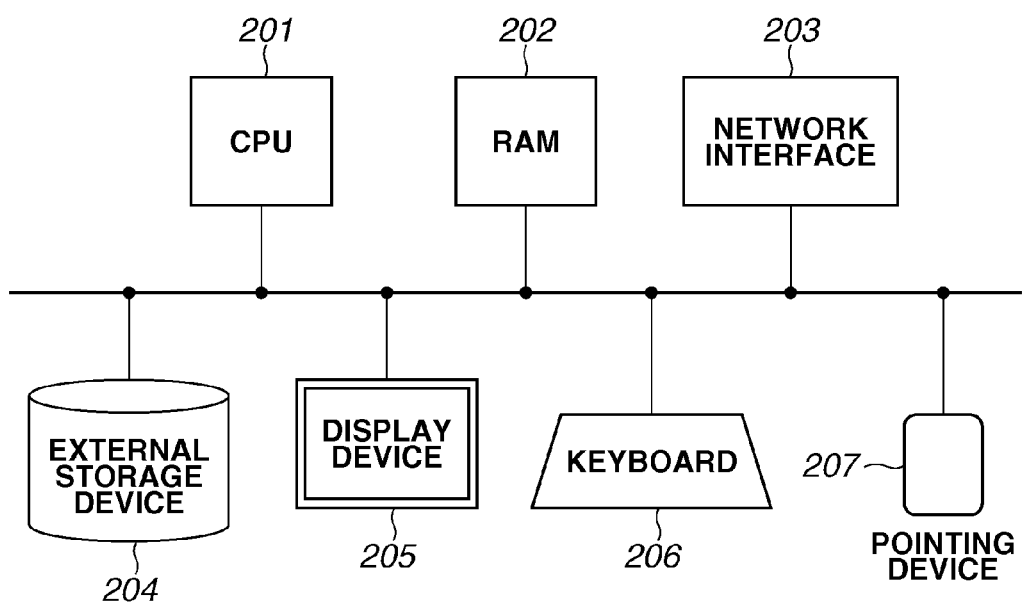
FIG. 2 schematically illustrates a configuration of a computer apparatus according to an exemplary embodiment.

A configuration of a computer apparatus according to the present exemplary embodiment is described below. FIG. 2 is a block diagram illustrating a configuration example of each of the client PC 102, the print service server 103, and the data conversion service server 104 according to the present exemplary embodiment. Although not illustrated in the drawing, each of the client PC 102, the print service server 103, and the data conversion service server 104 can be uniquely configured.

A central processing unit (CPU) 201 can perform various controls of the entire apparatus according to a control program stored in a random access memory (RAM) 202. The RAM 202 is a volatile memory serving as a main storage device that stores programs to be executed by the CPU 201, and various data (including document image). A network interface 203 can perform data transmission/reception processing, when it is connected to the network under the control of the CPU 201. An external storage device 204 is a nonvolatile memory, such as a magnetic disk or a flash memory, which stores processing target data and programs to be loaded into the RAM 202. An operator can use a pointing device 207 (including a keyboard 206 and a mouse) to access the contents displayed on a display device 205. However, the display device 205, the keyboard 206, and the mouse 207 may be unnecessary if it is feasible to operate the print service server 103 or the data conversion service server 104 or confirm contents displayed thereon via the network 101.

The CPU 201 that executes each program stored in the RAM 202 can call and use, if necessary, a part of the functions of an operating system (OS) stored in the RAM 202. Further, based on the program stored in the RAM 202, the CPU 201 can perform reading/writing of data contents temporarily stored in the RAM 202, and can perform reading/writing of data from/to the external storage device 204. Further, the CPU 201 can transmit and receive data to another apparatus via the network interface 203. Further, based on the program stored in the RAM 202, the CPU 201 can receive an instruction input via the keyboard 206 or the pointing device 207. The CPU 201 can cause the display device 205 to perform display processing.

Figure 3:
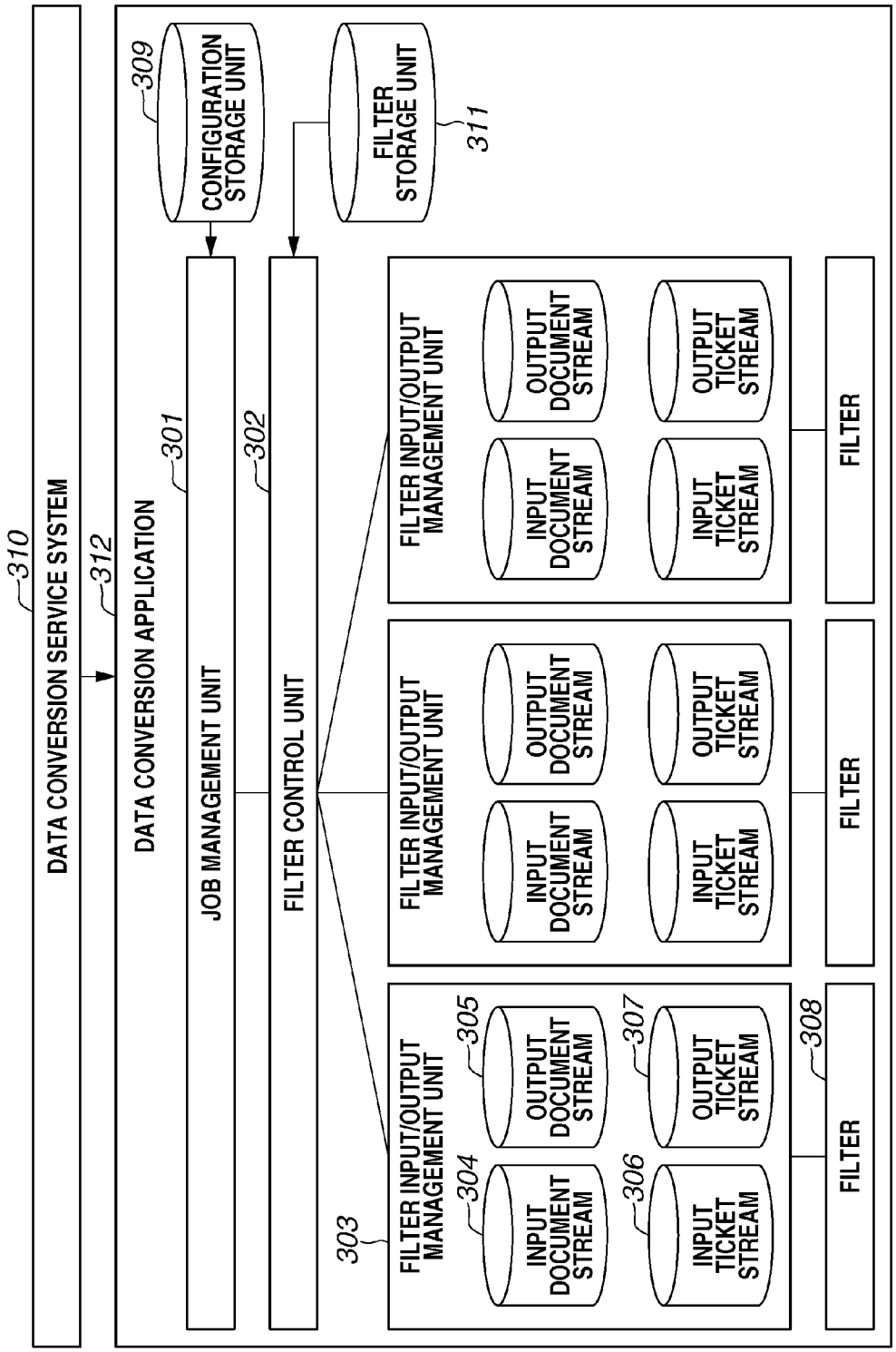
FIG. 3 schematically illustrates a configuration example of a data conversion application according to an exemplary embodiment.

FIG. 3 is a conceptual diagram illustrating a configuration of a data conversion application 312 according to the present exemplary embodiment. To realize each constituent component of a data conversion service system 310 and the data conversion application 312, the CPU 201 of the data conversion service server 104 executes program codes loaded in the RAM 202. The data conversion application 312 can be used by the data conversion service system 310, which operates in the data conversion service server 104. The data conversion application 312 uses a single or a plurality of data conversion modules at a sequence suitable to convert a processing target into print data that can be processed by a printer to be used in print processing, instead of using a printer driver to perform data conversion. Constituting a "stream" configuration composed of a plurality of data conversion modules connected in such a way as to reflect a data processing order can provide various data conversion functions. In the following description, each data conversion module (e.g., a data conversion unit or a data processing unit) is simply referred to as "filter". The stream in the present exemplary embodiment can be regarded as an address area (at least a partial area of the RAM 202 or the external storage device 204), which is secured by the data conversion application 312 for each filter 308. Further, when a plurality of filters cooperatively constitutes a stream, the stream can be shared by respective filters. In other word, each of the plurality of filters can access the stream. The filter usable in the present exemplary embodiment is, for example, a filter that can convert JPEG formatted image data into Portable Document Format (PDF) data or a filter that can convert PDF data into print data.

A job management unit 301 is configured to analyze a job input into the data conversion application 312 from the data conversion service system 310. Further, the job management unit 301 is configured to acquire input/output information corresponding to the job and filter configuration (defining the arrangement of a single or a plurality of filters) corresponding to the job type from a configuration storage unit 309. In the present exemplary embodiment, the job includes document information and ticket information.

A filter control unit 302 is configured to acquire program codes corresponding to a required filter from a filter storage unit 311, and generate a filter configuration including a filter input/output management unit 303 associated with each filter 308, which is necessary to process a job received from the data conversion service system 310, based on information obtained from the configuration storage unit 309. Further, the filter control unit 302 is configured to perform various controls (including initialization and processing execution instruction) for respective filters 308, and manage the filter input/output management unit 303 corresponding to each filter 308. The processing to be performed by the filter control unit 302 is described in detail below. The configuration storage unit 309 and the filter storage unit 311 can be provided in the external storage device 204 or the RAM 202 of the data conversion service server 104.

Each filter input/output management unit 303 is associated with a single filter 308 (one-to-one). The filter input/output management unit 303 is configured to manage an input document stream (i.e., an input data storage area) 304, an output document stream (i.e., an output data storage area) 305, an input ticket stream (i.e., an input setting area) 306, and an output ticket stream (i.e., an output setting area) 307, which are dedicated to a corresponding filter 308. The input document stream 304 can store a document file to be converted by the filter 308. The input ticket stream 306 can store a ticket having settings to be used by the filter 308 in the conversion. On the other hand, the output document stream 305 can store a document file converted by the filter 308. The output ticket stream 307 can store a ticket having settings (including log information) used by the filter 308 in the conversion. Further, in response to a request from the corresponding filter 308, the filter input/output management unit 303 can supply contents stored in the input document stream 304 or in the input ticket stream 306 to the filter 308. Next, job processing that can be performed by the data conversion application 312 according to the present exemplary embodiment is described in detail below. FIG. 18 is a flowchart illustrating a procedure of processing that can be realized by the CPU 201, which can realize each constituent component of the data conversion application 312, to process a job received from the data conversion service system 310. In step S1801, the CPU 201 performs job initialization processing to constitute a filter or a stream based on information included in the job. Then, in step S1802, the CPU 201 executes the job using the filter or the stream constituted in step 1801.

Figure 4:
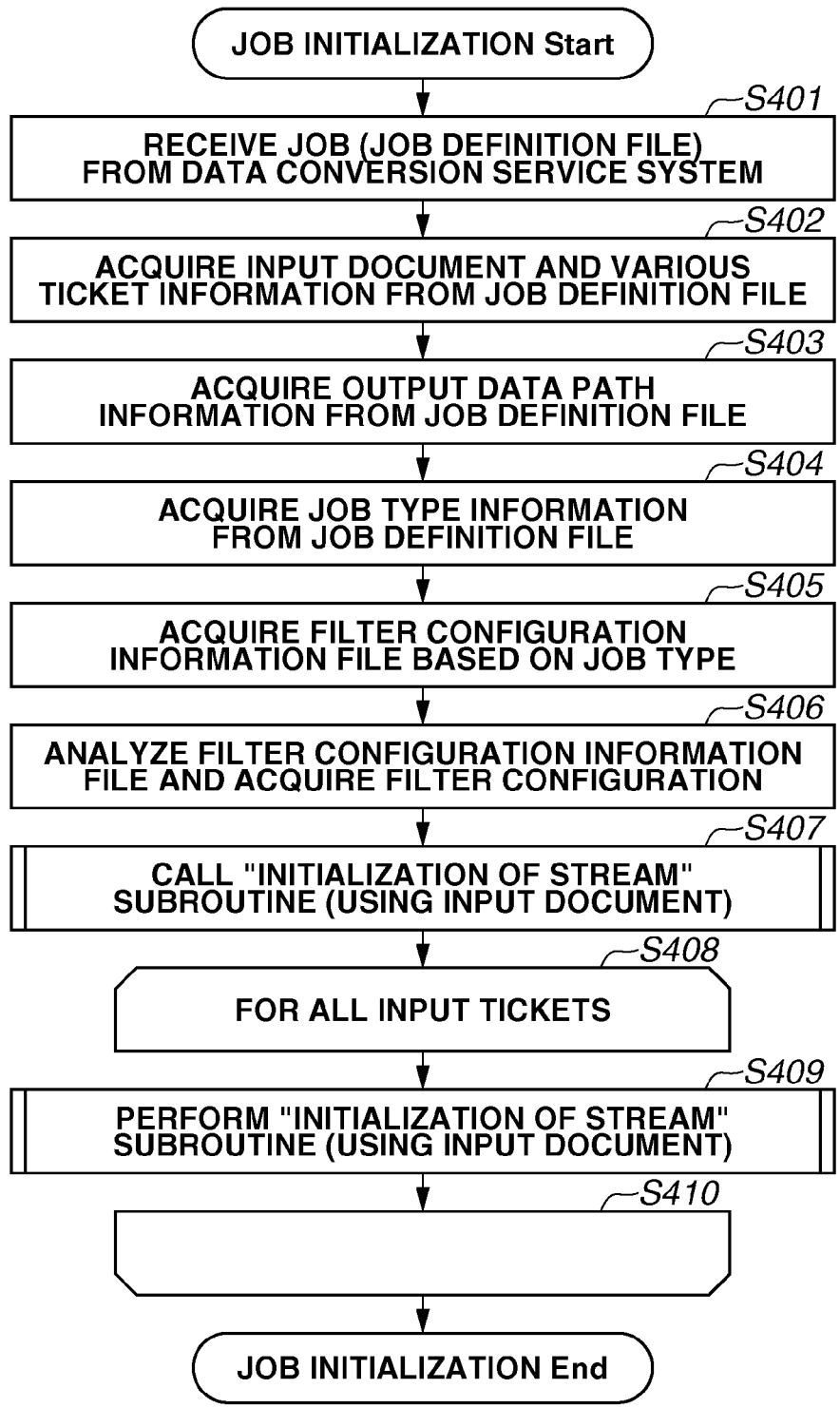
FIG. 4 is a flowchart illustrating job initialization processing according to an exemplary embodiment.

FIG. 4 is a flowchart illustrating details of the job initialization processing to be performed in step S1801 illustrated in FIG. 18. The program that can execute the processing illustrated in the flowchart in FIG. 4 is stored in an appropriate storage device, including the RAM 202 of the data conversion service server 104 or the external storage device 204, and can be executed by the CPU 201.

In step S401, the job management unit 301 receives a job definition file (simply referred to as "job definition information" in the following description), as setting information, from the data conversion service system 310. The job definition information indicates the outline of each job, and includes information about processing contents and information about input/output of ticket or processing target data (document). The job definition information is described in detail below. The job definition information can be positioned at a predetermined position (e.g., at the head or the tail of each job). Alternatively, the data conversion service system 310 can independently issue the job definition information prior to the transmission of each job.

In step S402, the job management unit 301 acquires an input document and input path information about various tickets (information indicating an input source) from the job definition information received in step S401. In the present exemplary embodiment, the input path information is described in "InputPath" and "TicketPath" illustrated in FIG. 5, as described in detail below. The job management unit 301 acquires the input document together with various tickets from a storage area indicated by the acquired input path information (more specifically, from the print service server 103 or the data conversion service server 104).

In step S403, the job management unit 301 acquires information about an output path via which the processed data can be output (i.e., information indicating an output destination), from the job definition information received in step S401. In the present exemplary embodiment, the output path information is described in "OutputPath" illustrated in FIG. 5.

In step S404, the job management unit 301 acquires job type information from the job definition information received in step S401. In the present exemplary embodiment, the job type is described in "Application" illustrated in FIG. 5.

In step S405, the job management unit 301 acquires filter configuration information corresponding to the job type based on the job type acquired in step S404. The processing to be performed in step S405 is described in detail below with reference to FIG. 6.

In step S406, the job management unit 301 analyzes the filter configuration information acquired in step S405, and acquires information relating to each module that constitutes the filter. The processing to be performed in step S406 is described in detail below with reference to FIG. 7.

In step S407, the filter control unit 302 calls an "initialization of stream" subroutine using the input document as argument. The processing content of the "initialization of stream" subroutine is described in detail below with reference to FIG. 8.

In step S408, the filter control unit 302 starts loop processing of steps S408 to step S410 to be repetitively performed for all input tickets.

In step S409, the filter control unit 302 calls the "initialization of stream" subroutine using the input ticket as argument. The processing content of the "initialization of stream" subroutine is described in detail below with reference to FIG. 8.

In step S410, the filter control unit 302 terminates the "job initialization" processing of the flowchart illustrated in FIG. 4 upon completing the processing in step S409 for all input tickets.

<Job Definition Information>

FIG. 5 illustrates an example of the job definition information. The job definition information illustrated in FIG. 5 is described in an Extensible Markup Language (XML) format. "JobDefinition" is a route element (i.e., the highest-level element in a tree structure). The job definition information is applicable to a plurality of printers that can be used in the printing system illustrated in FIG. 1.

"Application", "InputPath", "OutputPath", and "TicketPath" are a plurality of child elements included in the "JobDefinition" element. The number of the "TicketPath" elements is equal to the total number of the input tickets. The "Application" element describes information about the function that can be realized by the data conversion service system 310 using the data conversion application. The "id" attribute of the "Application" element describes the name of the above-mentioned function.

The "InputPath" element describes information about the input document. The "value" attribute of the "InputPath" element describes the path of the input document. The "OutputPath" element describes information about the output of processed data. The "value" attribute of the "OutputPath" element describes the output path of the processed data. The "TicketPath" element describes information about the input ticket. The "type" attribute of the "TicketPath" element describes an identifier indicating the type of the input ticket. The "value" attribute of the "TicketPath" element describes the path of the input ticket.

<Correspondence Information>

FIG. 6 illustrates an example of correspondence information indicating a correspondence relationship between the job type and the filter configuration information. The correspondence information illustrated in FIG. 6 is stored in the configuration storage unit 309. The correspondence information illustrated in FIG. 6 is described in an XML format. "Applications" is a route element. "Application" is a child element of the "Applications" element. The "Application" element describes information about job type ("id" attribute) and information about filter configuration corresponding to the job type ("path" attribute of "FilterConfig" element).

In step S405 illustrated in FIG. 5, the job management unit 301 searches the "id" attribute of the "Application" element included in the correspondence information illustrated in FIG. 6, based on the job type acquired in step S404. If the coincidence in "id" attribute information is confirmed, the job management unit 301 acquires filter configuration information from the "path" attribute of the "FilterConfig" element, which is a child element of the "Application" element. In the example illustrated in FIG. 6, the job management unit 301 searches "id" attribute 601 of the "Application" element included in the correspondence information based on the job type information "PrintService1" acquired in step S404. Subsequently, the job management unit 301 acquires ".\PrintService1_FilterConfig.xml", as information indicating a storage area of the filter configuration information that is required in job processing, from the "path" attribute of the "FilterConfig" element (i.e., the child element of the "Application" element).

<Filter Configuration Information>

FIG. 7 illustrates an example of the filter configuration information that regulates the connection order of filters (hereinafter, simply referred to as "configuration information"). The configuration storage unit 309 stores a plurality of pieces of filter configuration information. The configuration information illustrated in FIG. 7, which is described in the XML format, includes a route element "Filters" and a plurality of child elements "Filter". "Module" is another child element of the "Filters" element. The "Module" element describes the path of a module of the filter (information indicating a storage area of each module of the filter, in the present exemplary embodiment). In step S406, the job management unit 301 acquires Filter order configuration with reference to the description order of the "Filter" element. The example illustrated in FIG. 7 includes three filters (i.e., Filter A, Filter B, and Filter C) which are described in this order. The arranging order of the filters coincides with the job processing sequence.

In the present exemplary embodiment, in steps S404 to S406, the job management unit 301 acquires the filter configuration information from the configuration storage unit 309 based on the job type described in the job definition information and determines the filter configuration. However, the present invention is not limited to the above-mentioned method. For example, it is useful that the job definition information includes information relating to the filter configuration information so that the job management unit 301 can determine the filter configuration based on the included filter configuration information.

Figure 8:
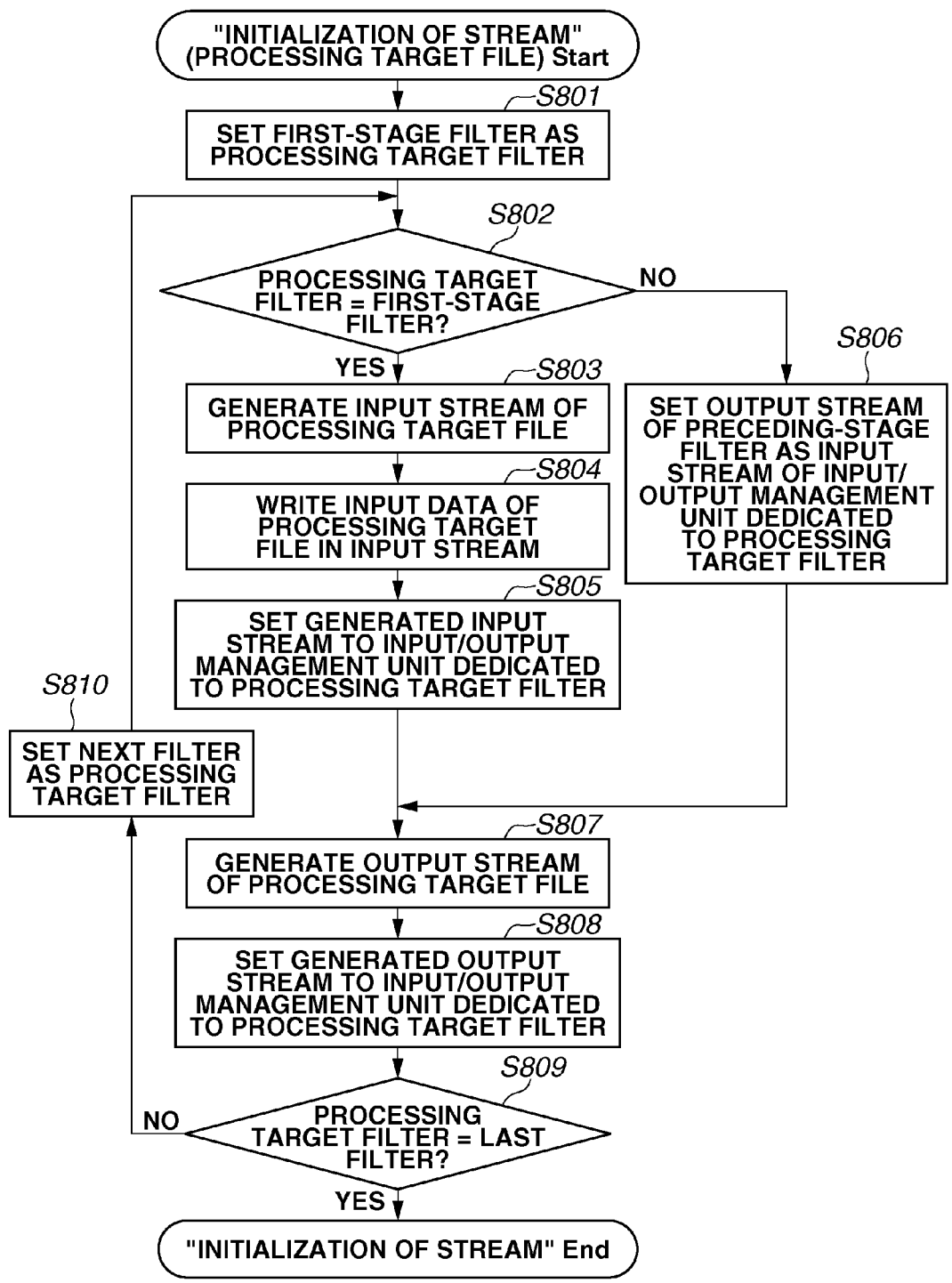
FIG. 8 is a flowchart illustrating stream initialization processing according to an exemplary embodiment.

FIG. 8 is a flowchart illustrating stream initialization processing to be performed in step 407 or step S409 illustrated in FIG. 4. Processing in each step can be executed by the CPU 201. Similar to FIG. 4, the CPU 201 performs stream initialization processing to initialize or generate each stream (i.e., each of the input document stream 304, the output document stream 305, the input ticket stream 306, and the output ticket stream 307) illustrated in FIG. 3.

In step S801, the filter control unit 302 sets a first-stage filter as a processing target filter (i.e., a target filter to be subjected to the stream initialization processing).

In step S802, the filter control unit 302 determines whether the processing target filter is the first-stage filter. If it is determined that the processing target filter is the first-stage filter (YES in step S802), the operation proceeds to step S803. If it is determined that the processing target filter is not the first-stage filter (NO in step S802), the operation proceeds to step S806.

In step S803, the filter control unit 302 generates an input stream of the processing target file.

In step S804, the filter control unit 302 writes input data of the processing target file acquired in step S402 in the input stream generated in step S803.

In step S805, the filter control unit 302 sets the input stream generated in step S803 to the filter input/output management unit 303 dedicated to the processing target filter.

In step S806, the filter control unit 302 sets an output stream generated in step S807 in the processing for a preceding-stage filter that precedes the processing target filter as an input stream of the filter input/output management unit 303 dedicated to the present processing target filter. Through the above-mentioned processing, the input stream of the processing target filter can be equalized with the output stream of the preceding-stage filter that precedes the processing target filter.

In step S807, the filter control unit 302 generates an output stream of the processing target file. Subsequently, the filter control unit 302 stores the generated output stream by replacing it with the previously generated output stream.

In step S808, the filter control unit 302 sets the output stream generated in step S807 to the filter input/output management unit 303 dedicated to the processing target filter.

In step S809, the filter control unit 302 determines whether the processing target filter is the last filter. If it is determined that the processing target filter is the last filter (YES in step S809), the filter control unit 302 terminates the processing of the flowchart illustrated in FIG. 8. If it is determined that the processing target filter is not the last filter (NO in step S809), the operation proceeds to step S810.

In step S810, the filter control unit 302 sets a subsequent filter that follows the present processing target filter as a new processing target filter.

The CPU 201 performs sequential processing in steps S802 to S808 for all filters (including the first-stage filter to the last filter) through the processing in steps S801, S809, and S810.

As mentioned above, the CPU 201 controls the connection of a plurality of filters. In a case where one of the filters is designated as a focused filter (i.e., a focused processing unit), the above-mentioned processing is equivalent to allocating the output stream (i.e., the output document stream 305 and the output ticket stream 307) corresponding to the focused filter as the input stream (i.e., the input document stream 304 and the input ticket stream 306) of a subsequently-processed filter that follows the focused filter.

Next, the job execution processing (see step S1802 illustrated in FIG. 18) that can be performed by the data conversion application 312 is described in detail below with reference to FIG. 9. The data conversion application 312 starts the job execution processing after completing the job initialization processing.

Figure 9:
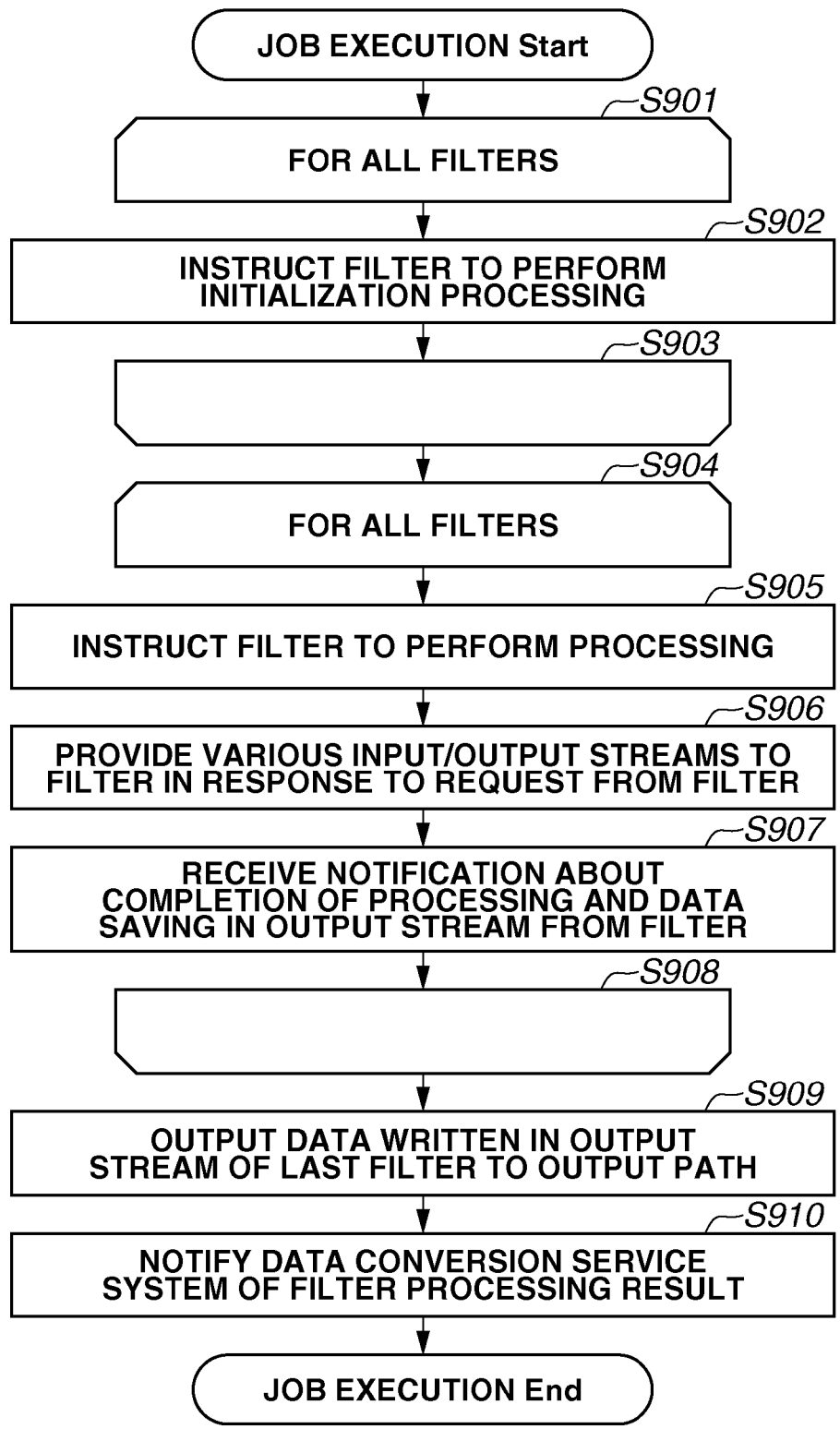
FIG. 9 is a flowchart illustrating job execution processing according to an exemplary embodiment.

The processing procedure of the flowchart illustrated in FIG. 9 is stored in an appropriate storage unit, such as the RAM 202 or the external storage device 204 of the data conversion service server 104, and can be executed by the CPU 201.

In step S901, the filter control unit 302 starts processing to be performed in step S902 for all filters 308.

In step S902, the filter control unit 302 instructs the filter 308 to perform initialization processing.

In step S903, if the filter control unit 302 has completed the processing in step S902 for all filters 308, then the operation proceeds to step S904.

In step S904, the filter control unit 302 and the filter input/output management unit 303 start sequential processing to be performed in steps S905 to step S907 for all filters 308. In this case, performing the sequential processing in steps S905 to S907 in parallel for respective filters is useful.

In step S905, the filter control unit 302 instructs the filter 308 to start the processing. The filter 308 performs the processing in response to the processing execution instruction.

In step S906, the filter input/output management unit 303 receives a request to provide various input/output streams from the currently processing filter 308 and provides the requested input/output streams to the filter 308. If a stream includes previously written data, the filter input/output management unit 303 immediately provides the stream to the filter 308. If a stream does not include any written data, the filter input/output management unit 303 waits for a while until a data is written in the stream and then provides a data containing stream to the filter 308. The filter 308 reads the data from the input stream and performs data conversion processing on the read data. The filter 308 outputs the converted data to the output stream.

In step S907, the filter control unit 302 receives a completion notification, which informs completion of the processing and saving (writing) of data in the output stream, from the filter 308.

In step S908, if the filter control unit 302 and the filter input/output management unit 303 have completed the sequential processing in steps S905 to S907 for all filters 308, then the operation proceeds to step S909.

In step S909, the filter control unit 302 outputs the data written in the output document stream of the last filter, namely the output data of the data conversion application, according to the output path acquired in step S403.

In step S910, the job management unit 301 notifies the data conversion service system 310 of processing results obtained through the above-mentioned filter processing.

As mentioned above, the printing system according to the present exemplary embodiment refers to job definition information in data conversion processing, data processing, and input/output processing. Therefore, a server is not required to prepare a plurality of printer drivers that are applicable to various printers beforehand. Further, it is feasible to reduce the duplication of storing a common portion of data conversion processing. Therefore, the user-friendliness in maintaining the server can be improved and the storage capacity of the server can be reduced.

In the first exemplary embodiment, the printing system generates input document and input ticket streams for all filters. However, there will be a filter that does not require any specific input ticket. For example, in a case where a filter converts text data into PDF data, the filter does not require any ticket that describes print settings (hereinafter, referred to as "print ticket"). In the first exemplary embodiment, even when such a filter is present, the printing system generates the print ticket stream for all filters. Therefore, the printing system unnecessarily performs processing for outputting a print ticket to the output stream for a filter that does not require any print ticket. In view of the foregoing, a second exemplary embodiment provides a printing system that skips a filter if it is determined that the filter does not perform reading/writing of an input ticket and generates a stream only for a filter that uses the ticket and connects the generated streams. In the description of the second exemplary embodiment, constituent components and steps are denoted by the same reference numerals if they are functionally similar to those described in the first exemplary embodiment, and redundant description thereof will be avoided.

Figure 10:
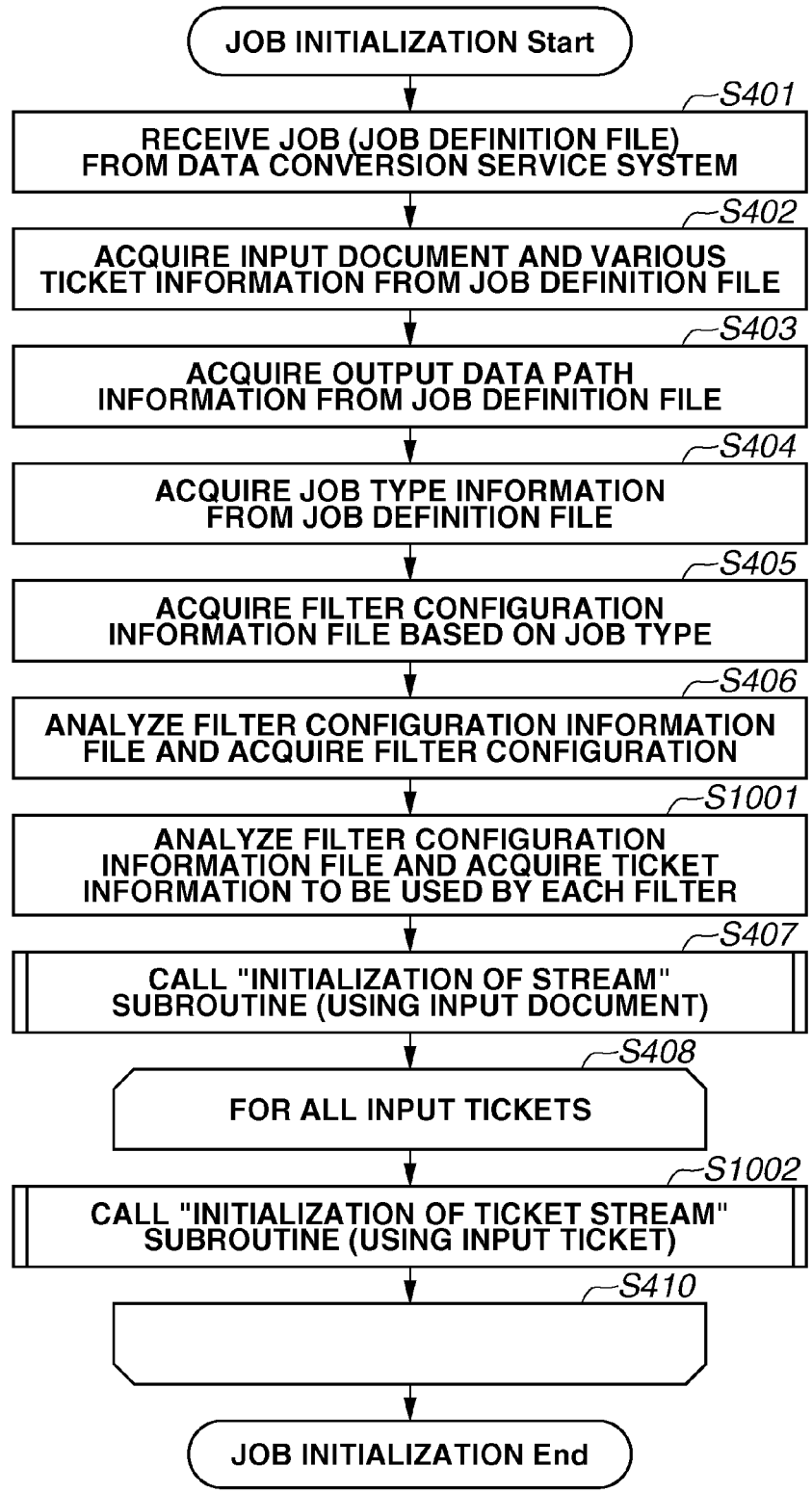
FIG. 10 is a flowchart illustrating job initialization processing according to an exemplary embodiment.

FIG. 10 is a flowchart illustrating details of job initialization processing according to the second exemplary embodiment. The flowchart illustrated in FIG. 10 is different from the flowchart illustrated in FIG. 4 in that processing to be performed in steps S1001 and S1002 is newly added, and step S409 is replaced by step S1002. The procedure of the flowchart illustrated in FIG. 10 is stored in an appropriate storage device, such as the RAM 202 or the external storage device 204 of the data conversion service server 104, and can be executed by the CPU 201.

In step S1001, the job management unit 301 analyzes the filter configuration information acquired in step S405, and acquires ticket information to be used by each filter. The processing to be performed in step S1001 is described in detail below with reference to FIG. 11.

FIG. 11 illustrates an example of the filter configuration information according to the second exemplary embodiment. The filter configuration information illustrated in FIG. 11 is different from the filter configuration information illustrated in FIG. 7 in that three "Tickets" elements 1101, 1102, and 1103 are newly added as child elements of the "Filter" element. A child element "Ticket" included in each "Tickets" element describes information about a ticket to be used. The "type" attribute of each "Ticket" element describes the type of the ticket. In step S1001, the job management unit 301 reads the "Tickets" element and acquires information about the "Ticket" element (i.e., child element), as information about a ticket to be used. First, according to the example illustrated in FIG. 11, the job management unit 301 reads the "Tickets" element 1101, i.e., a child element of the "Filter" element whose "name" attribute is "Filter A". The "Tickets" element 1101 includes two child elements, i.e., a "Ticket" element whose "type" attribute is "Ticket 1" and a "Ticket" element whose "type" attribute is "Ticket 2". Therefore, the job management unit 301 can acquire information that the Filter A uses Ticket 1 and Ticket 2. Next, the job management unit 301 reads the "Tickets" element 1102, which is a child element of the "Filter" element whose "name" attribute is "Filter B". The "Tickets" element 1102 includes a single child element, i.e., a "Ticket" element whose "type" attribute is "Ticket 2". Therefore, the job management unit 301 can acquire information that the Filter B uses Ticket 2. Further, the job management unit 301 reads the "Tickets" element 1103, which is a child element of the "Filter" element whose "name" attribute is "Filter C". The "Tickets" element 1103 includes a single child element, i.e., a "Ticket" element whose "type" attribute is "Ticket 1". Therefore, the job management unit 301 can acquire information that the Filter C uses Ticket 1.

Referring back to FIG. 10, in step S1002, the filter control unit 302 calls an "initialization of ticket stream" subroutine using the input ticket as argument. The processing content of the "initialization of ticket stream" subroutine is described in detail below with reference to FIG. 12.

Figure 12:
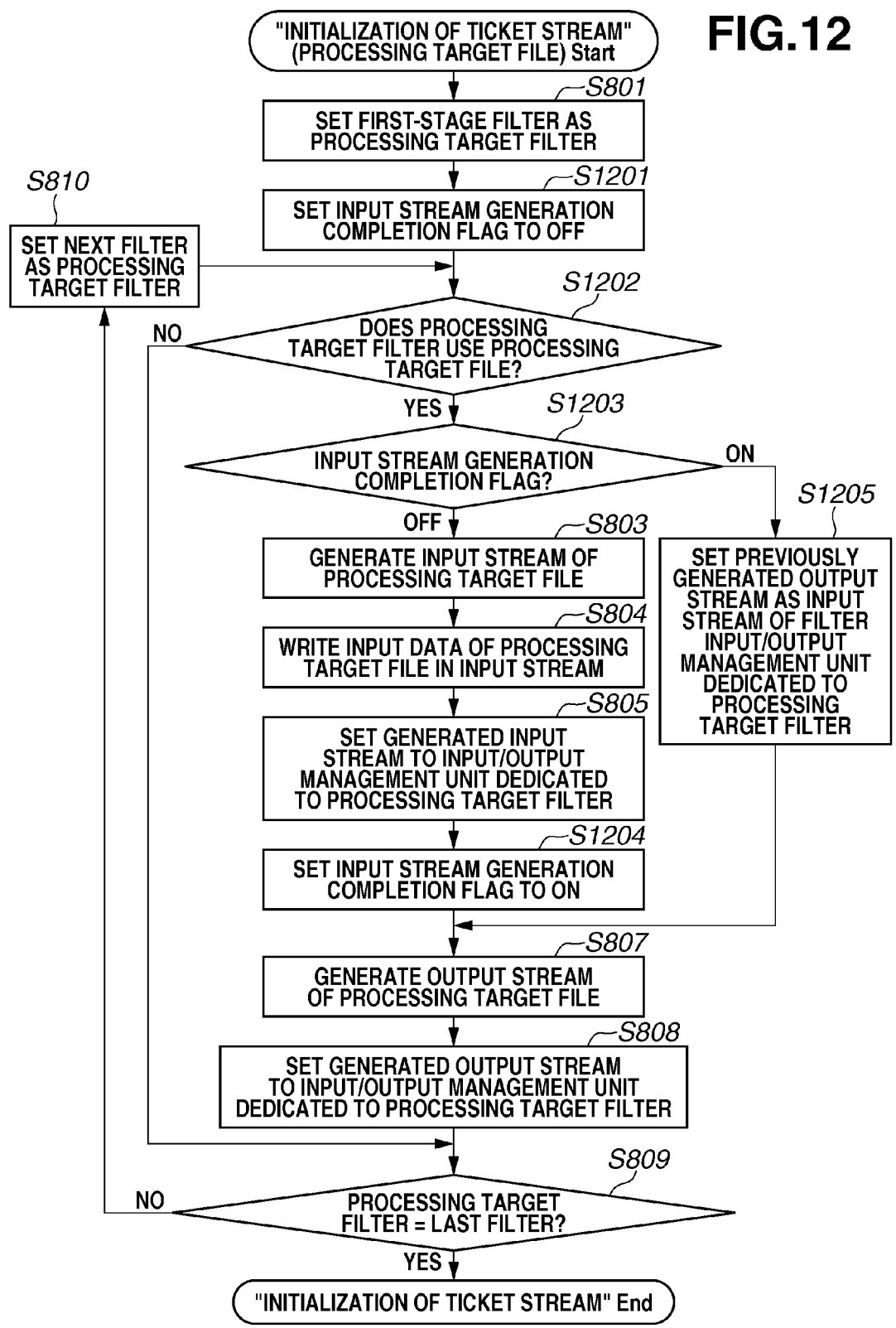
FIG. 12 is a flowchart illustrating "initialization of ticket stream" processing according to an exemplary embodiment.

FIG. 12 is a flowchart illustrating details of the "initialization of ticket stream" subroutine according to the second exemplary embodiment. The flowchart illustrated in FIG. 12 is similar to the flowchart illustrated in FIG. 8 described in the first exemplary embodiment. However, the flowchart illustrated in FIG. 12 is different from the flowchart in FIG. 8 in that processing to be performed in steps S1201 to S1205 is newly added, and steps S802 and S806 are replaced by steps S1203 and S1205.

In step S1201, the filter control unit 302 sets an input stream generation completion flag to OFF. The processing to be performed in steps S1203 and S1204 uses the input stream generation completion flag.

In step S1202, the filter control unit 302 determines whether the processing target filter uses the processing target file. The information acquired in step S1001 can be referred to in determining whether the processing target filter uses the processing target file. If it is determined that the processing target filter uses the processing target file (YES in step S1202), the operation proceeds to step S1203. If it is determined that the processing target filter does not use the processing target file (NO in step S1202), the operation proceeds to step S809.

In step S1203, the filter control unit 302 checks the setting value of the input stream generation completion flag. If it is determined that the input stream generation completion flag is OFF (OFF in step S1203), the operation proceeds to step S803. If it is determined that the input stream generation completion flag is ON (ON in step S1203), the operation proceeds to step S1205. Providing the input stream generation completion flag enables the filter control unit 302 to perform the processing in steps S803 to S1204 only for a filter that initially uses the ticket to generate an input stream thereof. For each of the following filters, the filter control unit 302 performs processing in step S1205 to set the previously generated output stream as an input stream of the processing target filter.

In step S1204, the filter control unit 302 sets the input stream generation completion flag to ON. Providing the processing in steps S1201, S1203, and S1204 makes the filter control unit 302 to perform the input stream generation processing (i.e., the sequential processing in steps S803 to S805) only one time for the initial filter.

In step S1205, the filter control unit 302 sets the previously generated output stream stored in step S807 as an input stream of the filter input/output management unit 303 dedicated to the present processing target filter. In other words, the input stream of the processing target filter is equalized with the previously generated output stream through the processing in step S1205.

According to the above-mentioned present exemplary embodiment, each filter can skip reading/writing processing for a ticket if it is unnecessary to refer to the ticket. Therefore, the printing system can speedily complete the processing.

In the first exemplary embodiment, a next-stage filter cannot read any ticket until a preceding-stage filter completes the ticket writing processing. Therefore, the next-stage filter waits for a while until the preceding-stage filter completes the processing. In other words, respective filters cannot start their processing in parallel to each other. A printing system according to a third exemplary embodiment is characterized by automatically copying a ticket to a filter that subsequently writes the ticket. In the description of the third exemplary embodiment, constituent components and steps are denoted by the same reference numerals if they are functionally similar to those described in the first and second exemplary embodiments, and redundant description thereof will be avoided.

FIG. 13 is a flowchart illustrating job initialization processing according to the third exemplary embodiment. The flowchart illustrated in FIG. 13 is different from the flowchart illustrated in FIG. 4 in that processing to be performed in steps S1301 and S1302 is newly added. The processing procedure of the flowchart illustrated in FIG. 13 is stored in an appropriate storage unit, such as the RAM 202 or the external storage device 204 of the data conversion service server 104, and can be executed by the CPU 201.

In step S1301, the job management unit 301 analyzes the filter configuration information acquired in step S405, and acquires access right information (i.e., processing attribute) about a ticket to be used by each filter. The processing to be performed in step S1301 is described in detail below with reference to FIG. 14.

FIG. 14 illustrates an example of the filter configuration information according to the third exemplary embodiment. The filter configuration information illustrated in FIG. 14 is different from the filter configuration information illustrated in illustrated in FIG. 7 in that three "Tickets" elements 1401, 1402, and 1403 are newly added as child elements of the "Filter" element. A child element "Ticket" included in each "Tickets" element describes information about a ticket to be used. The "type" attribute of each "Ticket" element describes the type of the ticket. The "access" attribute of each "Ticket" element describes access information about the ticket. More specifically, if information described in the "access" attribute is "R", it means to read the ticket. If information described in the "access" attribute is "W", it means to write (save) the ticket. In step S1301, the job management unit 301 reads the "Ticket" element (i.e., a child element of the "Tickets" element) and acquires information about the "type" attribute and the "access" attribute. First, according to the example illustrated in FIG. 14, the job management unit 301 reads the "Tickets" element 1401, i.e., a child element of the "Filter" element whose "name" attribute is "Filter A". The "Tickets" element 1401 includes two child elements, i.e., a "Ticket" element having "type" attribute "Ticket 1" and "access" attribute "R", and another "Ticket" element having "type" attribute "Ticket 2" and "access" attribute "RW". Therefore, the job management unit 301 can acquire information that the Filter A performs read only processing for Ticket 1, and performs read and write for Ticket 2. Next, the job management unit 301 reads the "Tickets" element 1402, which is a child element of the "Filter" element whose "name" attribute is "Filter B". The "Tickets" element 1402 includes two child elements. i.e., a "Ticket" element having "type" attribute "Ticket 1" and "access" attribute "RW", and another "Ticket" element having "type" attribute "Ticket 2" and "access" attribute "R". Therefore, the job management unit 301 can acquire information that the Filter B performs read and write processing for Ticket 1, and perform read only processing for Ticket 2. Further, the job management unit 301 reads the "Tickets" element 1403, which is a child element of the "Filter" element whose "name" attribute is "Filter C". The "Tickets" element 1403 includes two child elements, i.e., a "Ticket" element having "type" attribute "Ticket 1" and "access" attribute "R", and another "Ticket" element having "type" attribute "Ticket 2" and "access" attribute "R". Therefore, the job management unit 301 can acquire information that the Filter C performs read only processing for Ticket 1 and performs read only processing for Ticket 2.

Referring back to FIG. 13, in step S1302, the filter control unit 302 calls an "automatic copy of ticket" subroutine using the first-stage filter and the input ticket as argument. The processing content of the "automatic copy of ticket" subroutine is described in detail below with reference to FIG. 16.

FIG. 15 is a flowchart illustrating job execution processing according to the third exemplary embodiment. The CPU 201 can perform processing according to the flowchart illustrated in FIG. 15 instead of the flowchart illustrated in FIG. 9 (including similar processing) described in the first exemplary embodiment. The flowchart illustrated in FIG. 15 is different from the flowchart illustrated in FIG. 4 in that processing to be performed in steps S1501 to S1503 is newly added. The processing procedure of the flowchart illustrated in FIG. 15 is stored in an appropriate storage unit, such as the RAM 202 or the external storage device 204 of the data conversion service server 104 and can be executed by the CPU 201.

In step S1501, the filter control unit 302 starts repetitively performing processing in step S1502 for all input tickets. In the present exemplary embodiment, the job management unit 301 acquires the input tickets in the job initialization processing (see step S402).

In step S1502, the filter control unit 302 calls the "automatic copy of ticket" subroutine using the filter and the input ticket as argument. The processing content of the "automatic copy of ticket" subroutine is described in detail below with reference to FIG. 16. Through the processing performed in step S1502, the data can be automatically written into an input stream of an input ticket of each of the next-stage and subsequent filters. As a result, it becomes feasible to provide the input stream of the input ticket to the next-stage and subsequent filters at the processing timing of step S906 for these filters. Thus, the next-stage and subsequent filters can smoothly perform input ticket related processing.

If in step S1503 the filter control unit 302 completes the processing in step S1502 for all input tickets, the operation proceeds to step S907.

Figure 16:
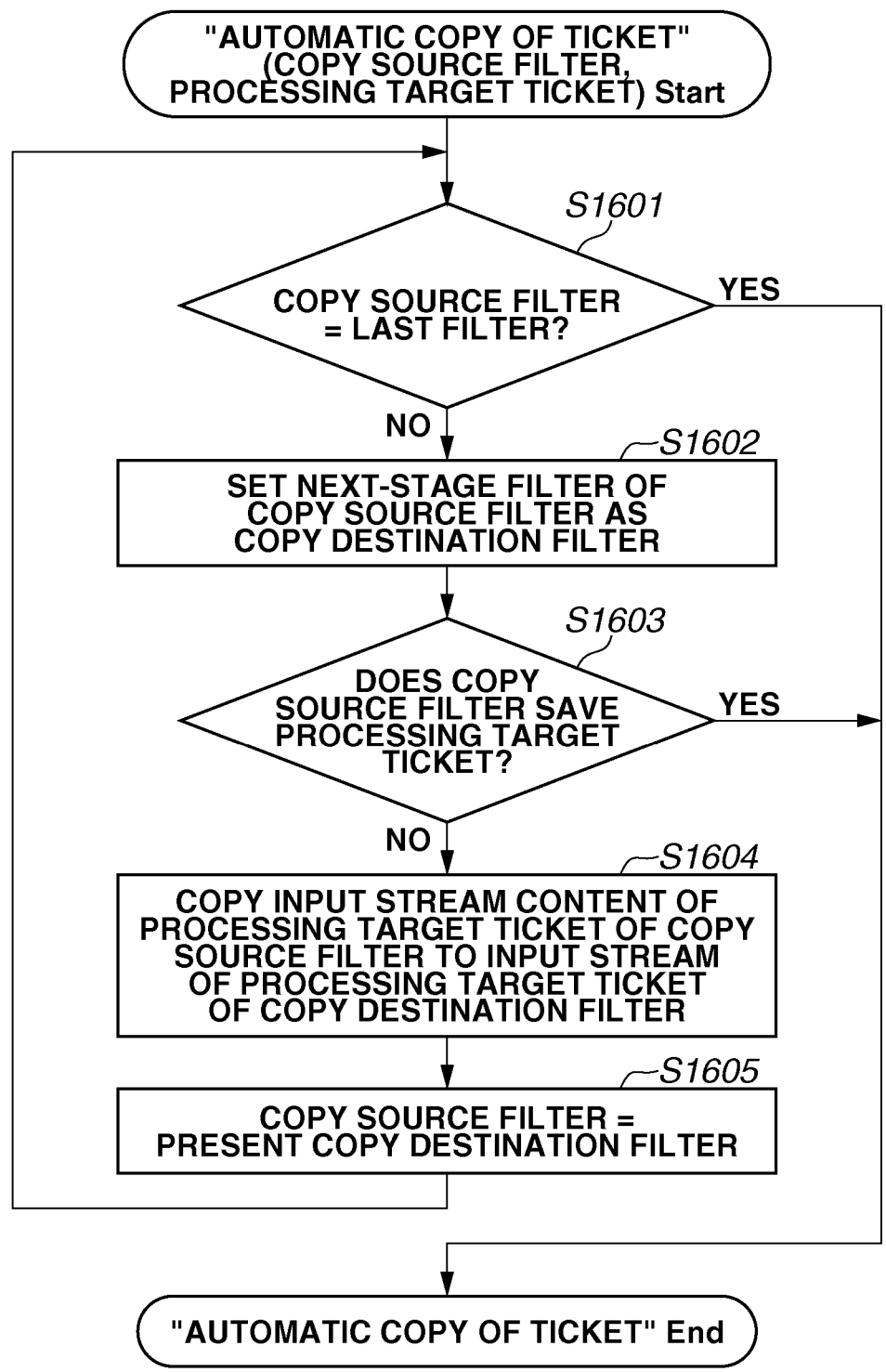
FIG. 16 is a flowchart illustrating "automatic copy of ticket" processing according to an exemplary embodiment.

FIG. 16 is a flowchart illustrating detailed processing of the "automatic copy of ticket" subroutine according to the third exemplary embodiment.

In step S1601, the filter control unit 302 determines whether a copy source filter is the last filter based on the configuration of the filter acquired in step S406. If it is determined that the copy source filter is the last filter (YES in step S1601), the filter control unit 302 terminates the processing of the flowchart illustrated in FIG. 16. If it is determined that the copy source filter is not the last filter (NO in step S1601), the operation proceeds to step S1602.

In step S1602, the filter control unit 302 sets a next-stage filter of the copy source filter as a copy destination filter. The next-stage filter of the copy source filter can be determined based on the configuration of the filter acquired in step S406.

In step S1603, the filter control unit 302 determines whether the copy source filter saves (writes) a processing target ticket. The information acquired in step S1301 can be referred to in determining whether the copy source filter saves the processing target ticket. If it is determined that the copy source filter saves the processing target ticket (YES in step S1603), the filter control unit 302 terminates the processing of the flowchart illustrated in FIG. 16. If it is determined that the copy source filter does not save (write) the processing target ticket (NO in step S1603), the operation proceeds to step S1604. In step S1604, the filter control unit 302 copies an input stream content of the processing target ticket of the copy source filter to an input stream of the processing target ticket of the copy destination filter.

In step S1605, the filter control unit 302 sets the present copy destination filter as the copy source filter. Subsequently, the operation returns to step S1601 and performs sequential processing in steps S1601 to S1604 for the copy source filter having been set in step S1605.

Next, the processing of the "automatic copy of ticket" subroutine performed according to the processing flow illustrated in FIG. 16 is described below with reference to FIGS. 17A and 17B.

FIG. 17A is a conceptual diagram illustrating a data conversion application in a case where the "automatic copy of ticket" subroutine is performed (see step S1302) in the job initialization processing flow illustrated in FIG. 13. In this case, it is presumed that the input ticket to be used as the argument in step S1302 is Ticket 1. The filter configuration illustrated in FIG. 17A includes filter A 1701, filter B 1702, and filter C 1703 arranged in this in order. Further, access information about Ticket 1 (i.e., processing target ticket) is "read only" for the filter A 1701, "read and write" for the filter B 1702, and "read only" for the filter C 1703.

The filter A 1701 (i.e., the copy source filter) is not the last filter (NO in step S1601). Therefore, the operation proceeds to step S1602. In step S1602, the filter control unit 302 sets the filter B 1702 (i.e., the next-stage filter that follows the filter A 1701) as the copy destination filter. In step S1603, the filter A 1701 (i.e., the copy source filter) does not save (write) Ticket 1 (i.e., the processing target ticket). Therefore, the operation proceeds to step S1604. In step S1604, the filter control unit 302 copies the content of a "Ticket 1" input stream 1704 of the filter A 1701 to a "Ticket 1" input stream 1705 of the filter B 1702. In step S1605, the filter control unit 302 sets the filter B 1702 (i.e., the next-stage filter that follows the filter A 1701) as the copy source filter.

The filter B 1702 is not the last-stage filter (NO in step S1601). Therefore, the operation proceeds to step S1602. In step S1602, the filter control unit 302 sets the filter C 1703 (i.e., the next-stage filter that follows the filter B 1702) as the copy destination filter. In step S1603, the filter B 1702 saves (writes) Ticket 1 (i.e., the processing target ticket). Therefore, the filter control unit 302 does not copy the content of the "Ticket 1" input stream 1705 of the filter B 1702 to a "Ticket 1" input stream 1706 of the filter C 1703, and terminates the "automatic copy of ticket" processing.

FIG. 17B is a conceptual diagram illustrating the data conversion application in a case where the "automatic copy of ticket" subroutine is performed (step S1502) in the job execution processing flow illustrated in FIG. 15. In this case, it is presumed that the filter and the input ticket to be used as the argument in step S1502 are filter B 1702 and Ticket 2. The filter configuration illustrated in FIG. 17B includes filter A 1701, filter B 1702, and filter C 1703 arranged in this order. Further, access information about Ticket 2 (i.e., processing target ticket) is "read and write" for the filter A 1701, "read only" for the filter B 1702, and "read only" for the filter C 1703.

The filter B 1702 (i.e., the copy source filter) is not the last filter (NO in step S1601). Therefore, the operation proceeds to step S1602. In step S1602, the filter control unit 302 sets the filter C 1703 (i.e., the next-stage filter that follows the filter B 1702) as the copy destination filter. In step S1603, the filter B 1702 (i.e., the copy source filter) does not save (write) Ticket 2 (i.e., processing target ticket). Therefore, the operation proceeds to step S1604. In step S1604, the filter control unit 302 copies the content of a "Ticket 2" input stream 1708 of the filter B 1702 to a "Ticket 2" input stream 1709 of the filter C 1703. In step S1605, the filter control unit 302 sets the filter C 1703 (i.e., the next-stage filter that follows the filter B 1702) as the copy source filter.

The filter C is the last-stage filter (YES in step S1601). In other words, the copy destination filter does not exist. Therefore, the filter control unit 302 terminates the "automatic copy of ticket" processing.

As mentioned above, according to the present exemplary embodiment, if an input ticket is a read only ticket, the printing system copies the content of the ticket to ticket work areas (i.e., input ticket streams) of a plurality of filters when the printing system starts processing. Thus, the present invention enables a plurality of filters to perform ticket processing in parallel to each other. In other words, the parallel execution of the processing performed by respective filters can increase the efficiency of the entire processing.

Although the above-mentioned exemplary embodiments have been described based on the printing system, the present invention is not limited to the printing system. For example, if the present invention is applied to a data conversion system dedicated to a viewing or reading device, it becomes unnecessary to prepare a program independently for each device.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093890 filed Apr. 26, 2013, which is hereby incorporated by reference herein in its entirety.

What is claimed is:

1. A data processing apparatus to acquire a job from an external apparatus via a network and process the job, wherein the job includes data to be processed and setting information required to process the data, the data processing apparatus comprising:

at least one processor coupled to a memory;

a storage unit configured to store, in the memory, a plurality of data processing modules to be used to process the job;

a selection unit configured to select, from the plurality of data processing modules using the at least one processor, a plurality of data processing modules to be used in processing the data based on setting information included in the job; and a processing unit configured to cause the at least one processor to use the selected plurality of data processing modules to sequentially perform processing on the data, wherein, in a case where processing is to be sequentially performed by a first processing module and then a second processing module included in the selected plurality of data processing modules and then a third processing module included in the selected plurality of data processing modules, the processing unit is configured to input information processed by the first processing module and setting information used by the first processing module and including setting of processing of the first processing module, processing of the second processing module and processing of the third processing module into the second processing module and the third processing module, the second processing module and the third processing module are referring to the setting information for processing, and the processing unit is configured to input information processed by the second processing module into the third processing module.

2. The data processing apparatus according to claim 1, wherein processing unit is configured to allocate an input data storage area that stores input data to be input to each processing module, and an output data storage area that stores output data obtained by processing each processing module, to a memory, for each of the plurality of data processing modules, and wherein the processing unit is configured to allocate an output data storage area of the first processing module as an input data storage area of the second processing module.

3. The data processing apparatus according to claim 1, wherein the processing unit is configured to allocate an input setting area that stores setting information required to process input data to be input to each processing module, and an output setting area that stores setting information used by each processing module, to a memory, for each of the plurality of data processing modules, and wherein the processing unit is configured to allocate an output setting area of the first processing module as an input setting area of the second processing module.

4. The data processing apparatus according to claim 1, wherein the setting information is described in an Extensible Markup Language (XML) format.

5. The data processing apparatus according to claim 1, wherein at least one of the plurality of data processing modules is a module configured to convert data included in the job into page-description language (PDL) data based on the setting information.

6. The data processing apparatus according to claim 1, wherein the setting information includes designation information indicating a printer that performs printing based on the job, and at least one of the plurality of data processing modules is a module capable of converting the data into print data that can be processed by the printer indicated by the designation information.

7. The data processing apparatus according to claim 1, wherein at least one of the plurality of data processing modules is a module configured to convert the data included in the job into Portable Document Format (PDF) data based on the setting information.

8. The data processing apparatus according to claim 1,
wherein the processing unit is configured to allocate an input setting area that stores setting information required to process input data to be input to each processing module, and an output setting area that stores setting information used by each processing module, to a memory, for each of the plurality of data processing modules, and control whether the second processing module refers to an output setting area of the first processing module and wherein, when the second processing module does not refer to an output setting area of the first processing module, the processing unit is configured to allocate the output setting area of the first processing module as an input setting area of the third processing module that processes processing data of the second processing module.

9. The data processing apparatus according to claim 1,
wherein the processing unit is configured to allocate an input setting area that stores setting information required to process input data to be input to each processing module, and an output setting area that stores setting information used by each processing module, to a memory, for each of the plurality of data processing modules, and wherein the processing unit is configured to copy the setting information included in the job to at least one input setting area that precedes a processing module that initially changes the setting information included in the job, in a processing order of the selected plurality of data processing modules.

10. A system comprising:
a client configured to transmit a job as a print instruction;
a printer configured to perform printing based on the print instruction;
a print service server configured to issue data conversion request based on the job transmitted by the client; and
a data conversion service server configured to convert the job into print data usable by the printer based on the data conversion request,
wherein the data conversion service server includes:

at least one processor coupled to a memory,
a storage unit configured to store, in the memory, a plurality of data processing modules to be used to process the job,
a selection unit configured to select, from the plurality of data processing modules using the at least one processor, a plurality of data processing modules to be used in processing the data based on setting information included in the job, and
a processing unit configured to cause the at least one processor to use the selected plurality of data processing modules to sequentially perform processing on the data,
wherein, in a case where processing is to be sequentially performed by a first processing module and then a second processing module included in the selected plurality of data processing modules and then a third processing module included in the selected plurality of data processing modules, the processing unit is configured to input information processed by the first processing module and setting information used by the first processing module and including setting of processing of the first processing module, processing of the second processing module and processing of the third processing module into the second processing module and the third processing module, the second processing module and the third processing module are referring to the setting information for processing, and the processing unit is configured to input information processed by the second processing module into the third processing module.

11. A method for controlling a data processing apparatus to acquire a job from an external apparatus via a network and process the job, wherein the job includes data to be processed and setting information required to process the data, and wherein the data processing apparatus includes a storage unit configured to store a plurality of data processing modules to be used to process the job, the method comprising:
selecting, from the plurality of data processing modules, a plurality of data processing modules to be used in processing the data based on setting information included in the job; and
causing the selected plurality of data processing modules to sequentially perform processing on the data,
wherein, in a case where processing is to be sequentially performed by a first processing module and then a second processing module included in the selected plurality of data processing modules and then a third processing module included in the selected plurality of data processing modules, causing includes inputting information processed by the first processing module and setting information used by the first processing module and including setting of processing of the first processing module, processing of the second processing module and processing of the third processing module into the second processing module and the third processing module, the second processing module and the third processing module are referring to the setting information for processing, and causing includes inputting information processed by the second processing module into the third processing module.

12. A non-transitory computer-readable storage medium storing a program to cause a computer to perform a method for controlling a data processing apparatus to acquire a job from an external apparatus via a network and process the job, wherein the job includes data to be processed and setting information required to process the data, and wherein the data processing apparatus includes a storage unit configured to store a plurality of data processing modules to be used to process the job, the method comprising:
- selecting, from the plurality of data processing modules, a plurality of data processing modules to be used in processing the data based on setting information included in the job; and
- causing the selected plurality of data processing modules to sequentially perform processing on the data,
- wherein, in a case where processing is to be sequentially performed by a first processing module and then a second processing module included in the selected plurality of data processing modules and then a third processing module included in the selected plurality of data processing modules, causing includes inputting information processed by the first processing module and setting information used by the first processing module and including setting of processing of the first processing module, processing of the second processing module and processing of the third processing module into the second processing module and the third processing module, the second processing module and the third processing module are referring to the setting information for processing, and causing includes inputting information processed by the second processing module into the third processing module.

* * * * *